July 4, 1939. R. H. KINGDON 2,165,103
MOUNTING MEANS FOR ENCLOSED ELECTRIC DEVICES
Filed Dec. 6, 1937 2 Sheets-Sheet 1
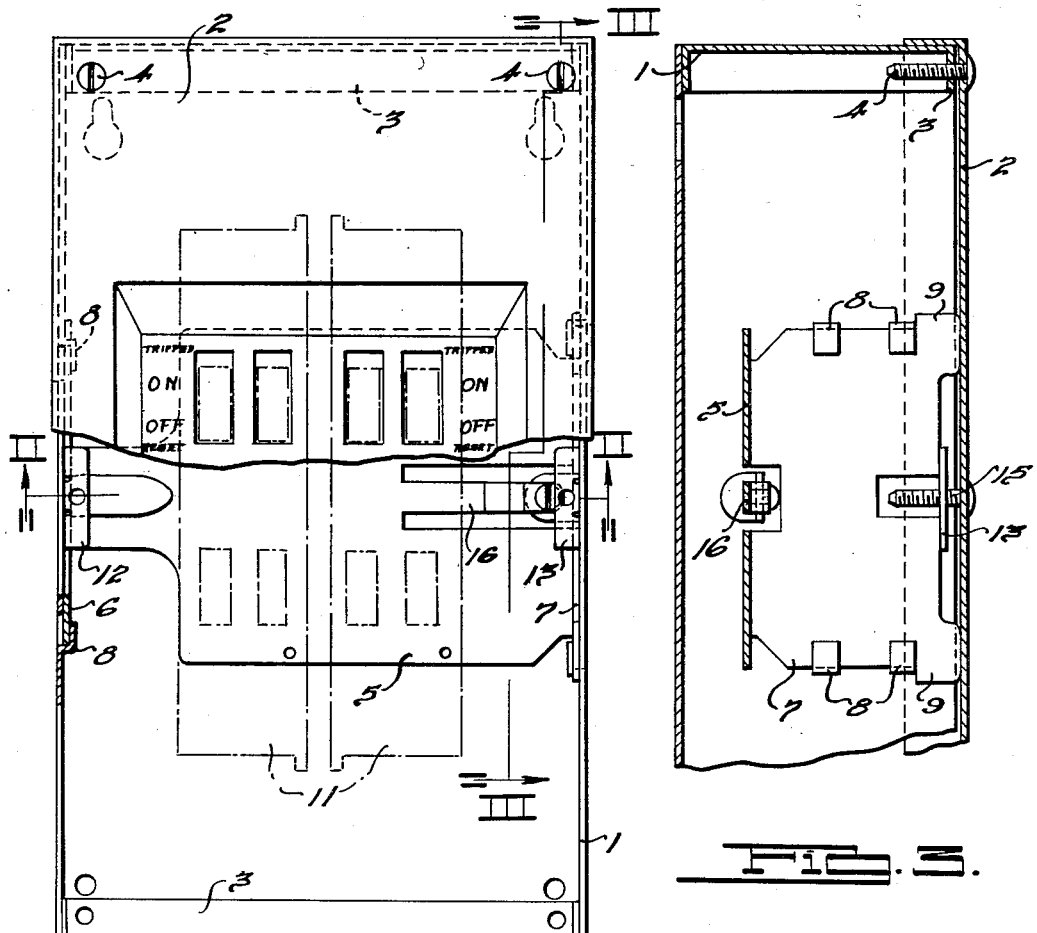
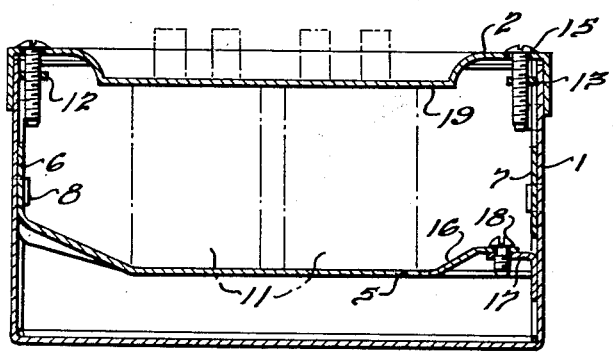
INVENTOR
Ralph H. Kingdon.
BY Myron J. Giebold
ATTORNEY July 4, 1939.　　　　　R. H. KINGDON　　　　　2,165,103
MOUNTING MEANS FOR ENCLOSED ELECTRIC DEVICES
Filed Dec. 6, 1937　　　2 Sheets-Sheet 2

INVENTOR
Ralph H. Kingdon.
BY Myron J. Seibold
ATTORNEY

Patented July 4, 1939

2,165,103

UNITED STATES PATENT OFFICE 2,165,103

MOUNTING MEANS FOR ENCLOSED ELECTRIC DEVICES

Ralph H. Kingdon, Detroit, Mich., assignor to Square D Company, Detroit, Mich., a corporation of Michigan Application December 6, 1937, Serial No. 178,207

11 Claims. (Cl. 174—57)

This invention relates to a supporting and enclosing means for an electric instrumentality such as an automatic electric circuit breaker of the type shown and described in Patents Nos. 2,096,545 to 2,096,548 inclusive issued to John G. Jackson on October 19, 1937.

One object of the present invention is an enclosing and mounting means for an electric instrumentality such as an automatic electric circuit breaker in which the instrumentalities or circuit breakers are movable with respect to the box proper to properly locate the instrumentalities with respect to the box cover by means manipulable from the outside of the box cover.

Another object of the invention is to provide supporting and enclosing means for electric instrumentalities such as automatic electric circuit breakers including an enclosing box with a pan upon which said instrumentalities are mounted being supported by the main body of the box in slidable relation and in which means are provided accessible from the front of the box cover for properly adjusting the position of the units with respect to the cover by moving the pan relative to the box.

Another object of the invention is to provide an enclosing and mounting means according to the preceding objects in which the supporting means or pan for the instrumentalities is connected to the body of the box so as to ground the pan thereto in such a manner as not to disturb the adjustment of the pan relative to the box.

Another object of the invention is the provision of a supporting and mounting means according to the immediately preceding object in which the grounding means also holds the pan within the box to its desired extremes of adjustment but is readily releasable to permit the entire removal of the pan.

Other objects and features of the invention will be readily apparent to those skilled in the art from the following specification and appended drawings illustrating certain preferred embodiments of the invention in which:

Figure 1 is a front elevational view of the enclosing and mounting means according to the present invention with the instrumentalities shown only diagrammatically and with a portion of the front cover broken away to show internal parts.

Figure 2 is a horizontal sectional view on the line II—II of Figure 1.

Figure 3 is a partial vertical sectional view on the line III—III of Figure 1.

Figure 5:
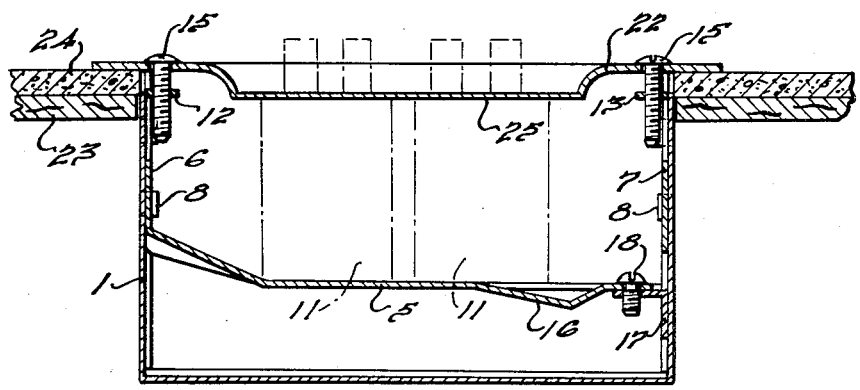
Figure 5 is a sectional view similar to Figure 2 but showing the arrangement used for a flush mounted construction with the supporting pan adjusted outwardly to properly locate the instrumentalities or circuit breakers on the pan with respect to the front flush mounted cover.

The device as illustrated in Figures 1 to 3 inclusive is more particularly directed to the surface type mounted unit while as shown in Figure 5 the representation is of a flush mounted unit with the box mounted within the wall and the front cover exchanged for the flush mounted cover therein shown. The enclosing and mounting means according to the present invention includes an enclosing box 1 having a removable cover 2. The top and bottom walls of the box are provided with front flanges 3 in which are threaded studs 4 holding the cover on the box. Within the box is disposed a supporting pan 5 generally U-shaped in cross section and having its side walls 6 and 7 engageable with the opposite interior side walls of the box. Guide lugs 8 are pressed out of the opposite side walls of the box, as shown, and receive the top and bottom edges of the sides 6 and 7 on the pan 5 to guide the pan within the box. The top and bottom edges of the walls 6 and 7 are provided with projecting portions 9 engageable with the front guides 8 to limit the interior position of the pan. Upon the back wall of the supporting pan 5 are mounted the electric circuit controlling instrumentalities 11 which may be, as previously stated, automatic electric circuit breakers of the type shown in the cited patents. Adjacent to their front edges the side walls 6 and 7 of the pan 5 are provided with flanges 12 and 13 provided with threaded openings 14, as shown, and into these threaded openings are adapted to be screwed studs 15 extending through openings in the exterior cover 2.

Figure 4:
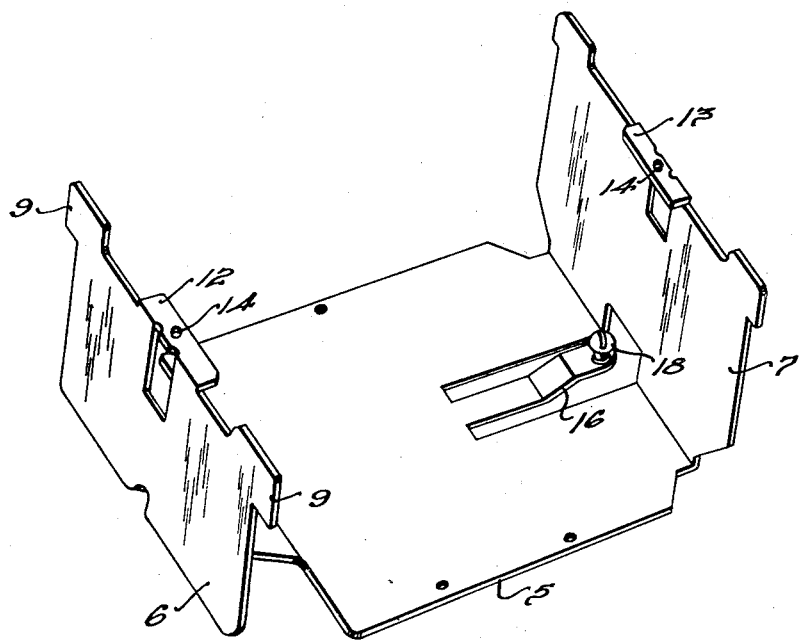
Figure 4 is a perspective view of the mounting pan.

The back wall of the pan 5 is cut away, as shown more particularly in the perspective view of Figure 4, to provide a relatively flexible finger 16 adapted to be rigidly attached to a flange 17 which is rigid with a side wall of the box as by means of a stud 18. This attachement of the finger 16 to the flange or bracket 17 provides a good electrical connection grounding the pan to the box and, in addition, secures the pan within the box so as to prevent accidental removal thereof. However, when the stud 18 is screwed out of the bracket 17 it is clear that the pan 5 and the instrumentalities or circuit breakers supported thereon may be slid forwardly and entirely removed from the box. As more particularly shown in Fig. 2, the cover 2 has an indented portion 19 adapted to have its inner surface engaged by the front surface of the instrumentalities or circuit breakers 11 and in this position the forward surface of the extension 9 directly contacts the interior of the cover 2 as more particularly shown in Fig. 3. Hence, with the surface mounted unit of Figures 1 to 3 inclusive the studs 15 may really be omitted if desired as the drawing of the cover 2 tightly against the box forces the pan 5 to its extreme interior position wherein the extensions 9 engage with the front pressed-out guides 8 and are pressed thereagainst by the engagement of the front edges of the projections 9 with the under surface of the cover. This securely clamps the pan in position and properly locates the instrumentalities with respect to the indented portion 19 of the cover 2 and hence the screws 15 in this particular form of the device may be omitted.

In Figure 5 there has been illustrated the provision or use of the enclosing and mounting means for a flush mounted device. The structure herein shown is identical with that previously described except that the cover 2 has been replaced by a cover 22 adapted to be placed flush against the exterior plaster surface of the wall. In this type of mounting the box 1 is usually disposed within the wall 7 before the plaster has been applied so that it is undesirable to rigidly locate the position of the mounting pan since the thickness of the plaster cannot be determined. The wall is represented by the lath 23 and the plaster 24. In this arrangement the box 1 is rigidly mounted within the wall and in this final installation of the parts the cover 22 is drawn tightly against the exterior plaster wall 24 by means of the studs 4 threaded into the top and bottom flanges 3 on the box 1. Thereafter the studs 15 are turned until the pan 5 is moved forwardly to the desired position with the front surfaces on the instrumentalities 11 engaged with the back surface of the indentation 25 on the cover 22. Due to the flexibility of the finger 16 this rather limited movement of the pan 5 is provided for without disturbing the connection at the stud 18 which not only secures the pan within the box against accidental removal but also electrically grounds the pan to the box.

From the description above it is seen that applicant has provided mounting means for electric circuit controlling instrumentalities such as automatic electric circuit breakers in which a common mounting pan and box may be used for both flush and surface mounting and in which the pan more particularly for the flush mounting may be readily adjusted forwardly to properly locate the instrumentalities with respect to the box cover. Also, that the mounting for the instrumentalities may be entirely removed from within the box and that it is normally maintained therein from accidental removal by means which also provides electrical grounding means from the pan to the box and which permits the desired adjustment of the pan without disturbing the grounding connection. Thus the pan is securely mounted within the box unless its entire removal is desired and is electrically grounded to the box while providing for limited adjustment of the pan to properly locate the instrumentalities supported thereon with respect to the cover 1. Adjustment of the pan may be easily and quickly effected from the front exterior of the box while the cover is in place.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What is claimed is:

1. Supporting and enclosing means for an electric circuit controlling instrumentality comprising an enclosing box, a pan slidably supported on said box, an electric circuit controlling instrumentality mounted on said pan, a front cover for said box, means securing said cover to the box and against the surface of a wall within which the box is disposed, screw means extending through said front cover and threaded into a part rigid with said pan, said screw means being accessible from the front of the cover when in place against said wall surface to move the pan relative to the box to adjust the position of the instrumentalities with respect to the cover.

2. Supporting and enclosing means for an electric circuit controlling instrumentality comprising an enclosing box, a supporting pan for said instrumentality slidably mounted in said box, means connecting said pan to said box so as to prevent accidental removal of the pan while providing for limited movement thereof relative to the box, a front cover for said box, means securing said cover to the box and against the surface of a wall within which the box is disposed, and means extending through said front cover and threaded into the pan for effecting movement thereof relative to the box while said cover is secured in place against said wall surface for adjusting the position of the instrumentality with respect to the front cover.

3. Supporting and enclosing means for electric circuit controlling instrumentalities comprising an enclosing box, a supporting pan mounted within said box and slidable relative thereto, electric circuit controlling instrumentalities mounted on said pan, means grounding said pan to said box while providing for limited relative movement between said pan and box, a front cover for said box, means securing said cover to the box and against the surface of a wall within which the box is disposed, and means extending through said front cover and threaded into said pan and adjustable from the exterior of the cover when in place against said wall surface for moving said pan relative to said box to adjust the position of the instrumentalities with respect to the cover.

4. Supporting and enclosing means for electric circuit controlling instrumentalities comprising an enclosing box, a supporting pan for said instrumentalities mounted on said box and movable relative thereto, means connecting said pan to said box and limiting the relative movement therebetween but releasable to permit removal of the pan, a front cover for said box, means for attaching said cover to the box and against the surface of a wall within which the box is disposed, and means accessible from the front of the cover when in place against said wall surface for moving the pan relative to the box to adjust the position of the instrumentalities relative to the cover.

5. Supporting and enclosing means for electric circuit controlling instrumentalities comprising an enclosing box, a generally U-shaped pan mounted in said box and having its side walls engageable with the side walls of the box, means rigid with said box side walls and engageable with said pan side walls to guide the movement of the pan relative to the box, a front cover for said box, means for attaching said cover to the box and against the surface of a wall within which the box is disposed, and means extending through said front cover and accessible from the exterior thereof when in place against said wall surface for adjusting the position of said pan within said guide means.

6. Supporting and enclosing means for electric circuit controlling instrumentalities comprising an enclosing box, a generally U-shaped pan supporting said instrumentalities within said box and having its opposite side walls engageable with the side walls of the box, guide means rigid with the pan side walls for guiding the movement of the pan relative to the box, means connecting said pan to the box and providing for limited relative movement therebetween, a front cover for said box, means for attaching said cover to the box and against the surface of a wall within which the box is disposed, and means accessible from the exterior of the cover when in place against said wall surface for moving the pan relative to the box to adjust the instrumentalities with respect to the cover.

7. Supporting and enclosing means for electric circuit controlling instrumentalities comprising an enclosing box, a supporting pan within said box of general U-shape and having its side walls guided upon the side walls of the box for sliding movement of the pan relative to the box, said pan being adapted to support said instrumentalities, a relatively flexible finger on said pan releasably engageable with a part rigid with said box, said finger permitting limited movement of the pan relative to the box while preventing entire removal of the pan therefrom until released, a cover for said box, and means for adjusting the pan relative to the box to properly locate the instrumentalities with respect to the front cover.

8. Supporting and enclosing means for an electric circuit controlling instrumentality comprising an enclosing box, a supporting pan for said instrumentality slidably supported upon the box, ground means connecting said pan to the box and preventing removal of the pan from the box until released, said ground connection being flexible to provide for a limited movement of the pan relative to the box, and cover means attachable to said box and engageable with said pan to properly locate it in position within the box.

9. Supporting and enclosing means for electric circuit controlling instrumentalities adapted for both flush and surface mounting comprising an enclosing box adapted to cooperate with either flush or surface covers as desired, a supporting pan slidably mounted on said box, electric circuit controlling instrumentalities mounted on said pan, means limiting the extreme backward movement of the pan to a position properly locating the instrumentalities with respect to a surface type cover, the pan in its extreme backward position being spaced an appreciable distance from the back wall of the enclosing box to provide a space for the reception of circuit wiring, and means on said pan engageable by means extending through the flush type cover and accessible from the exterior thereof to effect movement of the pan relative to the box and cover to properly locate the instrumentalities with respect to the flush type cover.

10. Supporting and enclosing means for electric circuit controlling instrumentalities adapted for both flush and surface mounting comprising an enclosing box adapted to cooperate with either flush or surface covers as desired, a supporting pan slidably mounted within said box, electric circuit controlling instrumentalities on said pan, means positively grounding said pan to said box and permitting limited relative movement between the pan and the box while preventing accidental removal of the pan, means limiting the extreme backward movement of the pan to a position properly locating the instrumentalities with respect to a surface type cover, the pan in its extreme backward position being spaced an appreciable distance from the back wall of the enclosing box to provide a space for the reception of circuit wiring, and means on said pan engageable by means extending through at least the flush type cover and accessible from the exterior thereof for effecting movement of the pan relative to the box and cover to properly locate the instrumentalities with respect to the cover.

11. Supporting and enclosing means for electric circuit controlling instrumentalities adapted for both flush and surface mounting comprising an enclosing box adapted to cooperate with either flush or surface covers as desired, a supporting pan slidably mounted on said box, electric circuit controlling instrumentalities mounted on said pan, means positively grounding said pan to said box and permitting limited relative movement between the pan and box while preventing entire removal of the pan until released, means limiting the extreme backward movement of the pan to a position properly locating the instrumentalities with respect to a surface type cover, the pan in its extreme backward position being spaced an appreciable distance from the back wall of the enclosing box to provide a space for the reception of circuit wiring, means on the box for securing either type cover thereto, and a plurality of threaded openings rigid with said pan and engageable with screw means extending through at least the flush type cover, said screw means being accessible from the exterior of the cover when in place and manipulable to effect movement of the pan relative to the box and cover to properly locate the instrumentalities with respect to the cover.

RALPH H. KINGDON.